United States Patent [19]

Jürgenhake

[11] Patent Number: 4,800,791
[45] Date of Patent: * Jan. 31, 1989

[54] TRANSPORT SYSTEM FOR AN AUTOMATIC CABLE PROCESSING MACHINE

[76] Inventor: Bernhard Jürgenhake, Im Brok 45, D-4782 Erwitte-Völlinghausen, Fed. Rep. of Germany

[*] Notice: The portion of the term of this patent subsequent to Apr. 7, 2004 has been disclaimed.

[21] Appl. No.: 854,082

[22] Filed: Apr. 21, 1986

Related U.S. Application Data

[63] Continuation-in-part of Ser. No. 730,348, May 3, 1985, Pat. No. 4,655,107.

[30] Foreign Application Priority Data

May 4, 1984 [DE] Fed. Rep. of Germany ....... 3416432
Aug. 7, 1984 [DE] Fed. Rep. of Germany ....... 3429054

[51] Int. Cl.$^4$ ............................................. B65H 5/10
[52] U.S. Cl. ........................................ 83/23; 83/155; 83/160; 83/373; 81/9.51; 198/463.4; 198/468.11
[58] Field of Search ...................... 83/23, 71, 409, 155, 83/160, 373; 81/9.51; 198/463.4, 468.11

[56] References Cited

U.S. PATENT DOCUMENTS 4,493,233 1/1985 Dusel et al. ............................. 83/71
4,655,107 4/1987 Juergenhake ........................... 83/23

Primary Examiner—Donald R. Schran
Attorney, Agent, or Firm—Horst M. Kasper

[57] ABSTRACT

A first belt conveyor carries a cable in the direction of the cable axis. A second belt conveyor receives cable coming form the first belt conveyor. The direction of transportation of the second belt conveyor is at a substantial angle relative to the transportation direction of the first belt conveyor. A guide channel, which extends from a delivery side of the first belt conveyor to an input side of the second belt conveyor, is provided for the cable. A slider is disposed opposite to the second belt conveyor relative to the guide channel for engaging a wire disposed in the guide channel. A slot is disposed between guide channel and second belt conveyor. The slot opens for a cable section pushed by the slider from the guide channel into the direction of the second belt conveyor for placing the cable between belts of the second belt conveyor system.

4 Claims, 8 Drawing Sheets

TRANSPORT SYSTEM FOR AN AUTOMATIC CABLE PROCESSING MACHINE

CROSS-REFERENCE TO RELATED APPLICATIONS

This application is a continuation-in-part application of another application filed May 3, 1985 and bearing Ser. No. 730,348 now U.S. Pat. No. 4,655,107. The entire disclosure of this latter application, including the drawings thereof, is hereby incorporated in this application as if fully set forth herein.

BACKGROUND OF THE INVENTION

1. Field of the Invention

The present invention relates to a transporting mechanism for an automatic cable processing machine which comprises a first transport unit disposed ahead of a cutting device, which transport unit receives cable from a roll and transports it in the direction of the axis of the cable, and a second transporting unit which transports cable between two endless belts in a direction perpendicular to the axis of the cable.

2. Brief Description of the Background of the Invention Including Prior Art

Prefabricated, so-called confectionated cable sets which have attached at their ends coupling elements such as for example plug contacts, are employed more and more in the production of motor vehicles and of household appliances, in particular in mass production. During the confectioning of the cables, these are cut to length, they are stripped on both sides and they are provided with electrical coupling elements. Frequently, it is desired to connect several cables of different lengths electrically via a plug contact. This confectioning is provided by machines which are called automatic confectioning machines. Here, the cable supplied on rollers is cut to length in longitudinal direction, and the coupling elements are attached while the cable is transported perpendicular to its longitudinal direction in the respective processing stages.

The German Patent Application Laid-Open DE-OS No. 3,243,906 teaches such an automatic cable confectioning machine. The second of the two transporting mechanisms is disposed perpendicular in transporting direction to first one and comprises two endless belts disposed one on top of the other. One of the two neighboring sections grips the cut-off cable end, and the cable is further transported perpendicular to its axis. In order to insert the cable end between the two belt sections, the two belt sections are lifted off each other in their front region by adjustment of a separating provision such as for example redirecting rollers, the cable is inserted and then the two belt sections are again placed against each other. This construction of the second transporting unit is disadvantageous since large weight masses have to be moved for insertion of the cable, requiring either large accelerating forces or long cycle times. In addition, the separating provision required for the insertion of the cable between the two neighboring section of the endless belts is expensive in its construction, cumbersome in its functioning and subject to relatively frequent repair requirements.

SUMMARY OF THE INVENTION

1. Purposes of the Invention

It is an object of the invention to provide a cable transporting apparatus where a second transporting unit does not have to perform additional movements in order to grip the cable, where the cable is to be transported perpendicular to its axis.

It is another object of the present invention to provide a cutting mechanism which safely cuts the cable in conjunction with the cable motion.

It is a further object of the present invention to provide guiding mechanisms which allow the positioning of the cable in an exact location for cutting and terminal attachment purposes.

These and other objects and advantages of the present invention will become evident from the description which follows.

2. Brief Description of the Invention

The present invention provides a transporting apparatus for an automatic cable processing machine comprising a first belt conveyor for carrying a cable in the direction of the cable axis and a second belt conveyor with an input side for receiving cable coming from the the delivery side of the first belt conveyor. The direction of transportation of the second belt conveyor is at a substantial angle relative to the transportation direction of the first belt conveyor. A guide channel for the cable extends from the delivery side of the first belt conveyor to the input side of the second belt conveyor, and a slider disposed oppositely to the second belt conveyor relative to the guide channel engages the cable disposed in the guide channel. A slot disposed between the guide channel and the second belt conveyor opens for the cable pushed by the slider from the guide channel into the direction of the second belt conveyor for placing the cable between belts of the second belt conveyor.

The second belt conveyor preferably includes two endless belts that clamp the cable between them and transport it in a direction at an angle of about 90 degrees relative to the cable axis. The two belts preferably are of a soft elastic material on the belt surface sides disposed relatively close to each other.

The slot opening can be disposed toward the side of second belt conveyor, can run over the full length of the guide channel, can be closed by spring sheet metal abutting like two lips, and the butt edges of the spring sheet metal can lift off from each other elastically upon sliding out of the cable from the guide channel.

A continuous running ledge of a groove can provide the guide channel into which the slider enters from a side relatively remote from the second belt conveyor and where the side toward the second belt conveyor is covered by two spring sheet metal pieces, which abut at the level of the groove like lips.

The second belt conveyor can include two drive belts disposed in a successive sequence as seen in the transportation direction of the first belt conveyor. One belt drive of the second belt conveyor can be adjustable in its position of relative distance to the first belt conveyor for allowing the length of cable sections to vary as desired. The belt drive of the second belt conveyor disposed relatively remote from the first belt conveyor can be adjustable in its position in a direction parallel to an axis of a roller supporting the belt motion of the belt drive.

The slider can be subdivided into two slider sections of which one each corresponds to a belt drive of the second belt conveyor with a separate drive for each slider section.

More particularly, the present invention provides a transporting apparatus for an automatic cable processing machine comprising a cable supply means, a first transporting unit for transporting in the direction of the axis of the cable a cable coming from the cable supply means, a guide channel surrounding and guiding the cable coming from the first transporting unit and a second transporting unit disposed near the output end of the guide channel for transporting the cable in a direction about perpendicular to the axis of the cable. A slider engaging the guide channel is constructed for moving the cable out of the guide channel. A slot in the guide channel disposed opposite to the slider is adapted to open up upon advancement of the slider toward the slot. A clamping pinch carrier disposed at the second transporting unit receives the cable, and a cutting station is provided for cutting the cable held by the second transporting unit.

The slot in the guide channel can be provided by adjoining sheet metal plate lips extending about the full length of the guide channel, and the abutting end edges of the sheet metal plate lips can elastically lift off from each other upon sliding the cable out of the guide channel.

The guide channel can be provided by a continuous groove of a ledge bar where the slider engages the groove from the side remote relative to the second transporting unit and the groove is covered with two sheet metal spring plates at the side of the ledge bar disposed toward the second transporting unit, where these plates adjoin and abut like lips at about the level of the groove.

The second transporting unit can be provided by two endless belts running in parallel where neighboring sections of the belts clamp the cable and the belts can be made from a soft elastic material at least one the sides mutually disposed toward each other.

The slider can be disposed such that it slides a cable in the transporting direction of the second transporting unit between neighboring cojoining sections of the endless belts forming the second transporting unit.

A guide sleeve can be disposed between the first transporting unit and the cutting station for surrounding the cable. Upon an insertion of the cable in between the two endless belts of the second transporting unit, this guide sleeve approximately follows the direction of motion of the cable. A swivelling axis can be provided for swivelling the guide sleeve in accordance with the direction of motion of the cable. The swivelling axis can be disposed relatively close to the input opening of the guide sleeve.

The swivelling guide sleeve can be forced by a spring in the cutting direction against a stop connected to the slider and can be lifted off the stop at the beginning of the cutting process. The disengagement of the guide sleeve from the stop connected to the slider can be performed by having the guide sleeve contact a fixed position stop while the slider continues its motion. The guide sleeve can be mated to a part of the cutting station which in turn is force transmittingly connected to the slider.

The part of the cutting station attached to a movable end of the guide sleeve and swivelling the guide sleeve can be connected to a device operating on the cable via a spring, and the part of the cutting station can be pressed during the cutting process by the spring against a fixed position stop.

A center ring punch can form the part of the cutting station swivelling the guide sleeve, where the center ring punch provides a knife edge in fixed position during the cutting process.

The guide sleeve can be force transmittingly connected to the slider. The force transmitting coupling between the guide sleeve and the slider can be disconnected at the beginning of the cutting process, and the guide sleeve can come to rest at a stop.

A movable cutting knife edge can form part of the cutting station, which cutting knife edge can be solidly connected to the slider.

The side of the slider disposed toward the cutting station can be provided as a knife edge of the cutting station.

Another aspect of the present invention provides an embodiment of a transporting apparatus for an automatic cable processing machine comprising a cable supply means, a first transporting unit for transporting a cable coming from the cable supply means in the direction of the axis of the cable, a second transporting unit comprising two endless belt transporting units following the first transporting unit and positioned in sequence along a line parallel to the transporting direction of the first transporting unit for transporting the cable in a direction about perpendicular to the axis of the cable and a clamping pinch carrier provided by the endless belts of the second transporting unit for moving the cable in a direction about perpendicular to its axis.

Here, belt transmission for operating the endless belt second transporting unit can be provided.

At least one endless belt of the second transporting unit can be adjusted in its position along a line running in parallel to the transporting direction of the first transporting unit.

The endless belt of the second transporting unit, disposed relatively remote from the first transporting unit, can be adjusted in its position along a line running in parallel to the transporting direction of the first transporting unit.

A slider can be provided for pushing the cable toward a clamping pinch of endless belts. The slider can be subdivided into sections according to the endless belts of the second transporting unit, and each section can be provided with a separately controllable drive.

A cutting station can be disposed between the first transporting unit and the second transporting unit. A guide sleeve can be disposed between the first transporting unit and the cutting station for surrounding the cable. Upon an insertion of the cable between two endless belts of the second transporting unit, the guide sleeve approximately follows the direction of motion of the cable.

A swivelling axis can be provided for swivelling the guide sleeve in accordance with the direction of motion of the cable, and a slider can be provided for moving the cable toward a clamping pinch between two endless belts. The swivelling axis can be disposed relatively close to the input opening of the guide sleeve.

The swivelling guide sleeve can be forced by a spring in the cutting direction against a stop connected to the slider and can be lifted off the stop at the beginning of the cutting process. The disengagement of the guide sleeve from the stop connected to the slider can be performed by having the guide sleeve contact a fixed position stop while the slider continues its motion. The guide sleeve can be mated to a part of the cutting station which in turn can be force transmittingly connected to the slider. The part of the cutting station attached to a movable end of the guide sleeve and swivelling the guide sleeve can be connected to a device operating on the cable via a spring, and the part of the cutting station can be pressed during the cutting process by a spring against a fixed position stop.

A center ring punch can form the part of the cutting station swivelling the guide sleeve, where the center ring punch provides a knife edge in fixed position during the cutting process.

The guide sleeve can be force transmittingly connected to the slider. The force transmitting coupling between the guide sleeve and the slider can be disconnected at the beginning of the cutting process, and the guide sleeve can come to rest at a stop.

A movable cutting knife edge solidly connected to the slider can form part of the cutting station.

The side of the slider disposed toward the cutting station can be provided as a knife edge of the cutting station.

Another aspect of the present invention provides a method of transporting a cable in an automatic cable processing machine comprising the following: A cable is fed in from a cable supply means and transported in the direction of its axis with a first transporting unit. The cable coming from the first transporting unit is surrounded and guided with a guide channel which is engaged with a slider constructed for moving the cable out of the guide channel through a slot in the guide channel disposed opposite to the slider and adapted to open up upon advancement of the slider toward the slot. The cable is transported in a direction about perpendicular to its axis with a second transporting unit disposed near the output end of the guide channel. A clamping pinch carrier disposed at the second transporting unit receives the cable which is then cut in a cutting station.

The cable can be guided in a guide sleeve disposed between the first transporting unit and the cutting station. Upon an insertion of the cable between two endless belts of the second transporting unit, this guide sleeve approximately follows the direction of motion of the cable.

The method of transporting a cable in an automatic cable processing machine can further comprise the following: A cable can be fed in from a cable supply means. A first transporting unit can then transport it in the direction of the axis of the cable. The cable can be transported in a direction about perpendicular to the axis of the cable by a second transporting unit comprising two endless belts following the first transporting unit and positioned in sequence along a line parallel to the transporting direction of the first transporting unit. The cable can be moved in a direction about perpendicular to its axis into a clamping pinch carrier provided by the endless belts of the second transporting unit.

The cable can be guided in a guide sleeve disposed between the first transporting unit and second transporting unit, where the guide sleeve approximately follows the direction of motion of the cable upon an insertion of the cable between the two endless belts of the second transporting unit.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
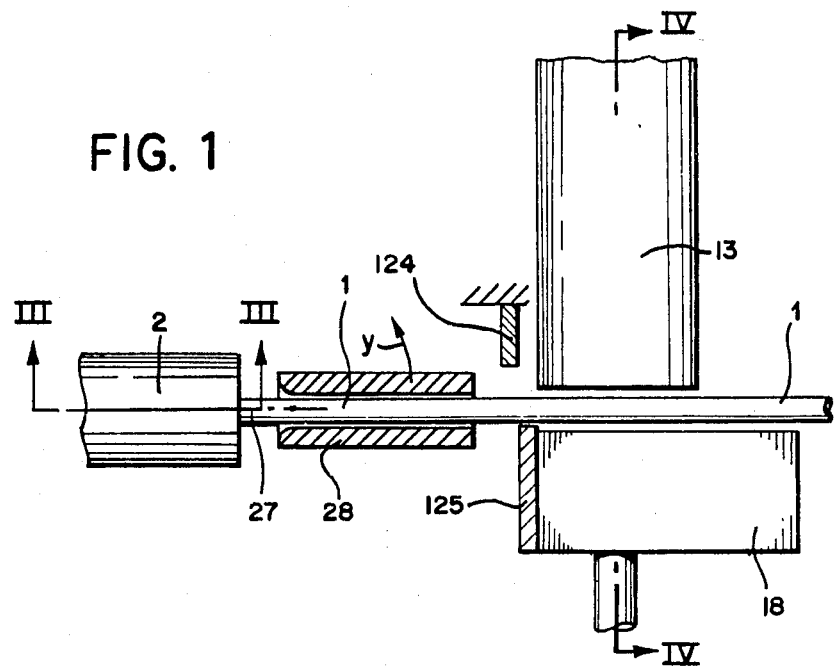
FIG. 1 is a schematic view of the two transporting units with the cutting provision disposed between and with the guide channel shown during the pre-transport of the cable in axial direction.

In accordance with the present invention, there is provided an automatic cable confectioning machine which comprises a first transporting mechanism 2 which transports the cable wound off from a roller in the direction of the the longitudinal axis of the cable toward a cutting station 124, 125. A second transporting mechanism 13 follows which further transports the cable perpendicular to the cable axis. A guide channel 14 is provided which follows to the first transport mechanism 2 and which guides the cable 1 in its longitudinal direction. The guide channels extends at least up to the second transport mechanism 13. A slider 18 engages into the guide channel 14 at a side remote from the second transport mechanism 13. The slider 18 pushes the cable 1 through an oppositely disposed slot which opens upon advancement of the slider 18, and the cable is pushed into a clamping feed of the second transport mechanism 13.

Figure 4:
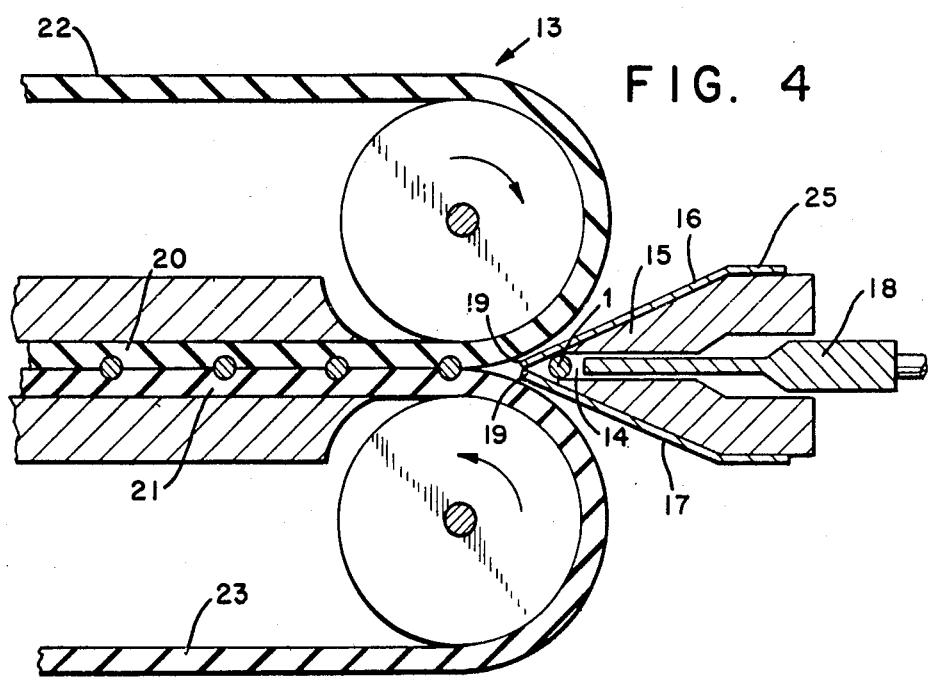
FIG. 4 is a section according to section line IV—IV through the transporting unit according to FIG. 1.

Preferably, the guide channel 14 is closed over its full length on the side toward the second transport mechanism 13 at a slot which can be opened by spring plates 16, 17 which abut via lips. The spring plates 16 and 17 can be attached near their ends 25 to the ledge bar 15 by screws or bolts, preferably at the point of the dashed line of FIG. 4. The abutting edges 19 of the spring plates disengage elastically upon pushing of the cable 1 out of the guide channel 14. The guide channel 14 is preferably formed by a continuous groove in a ledge bar 15 wherein a slider 18 engages from the side remote from the second transport mechanism 13, and the groove is covered by two spring plates 16, 17 on the side close to the second transport mechanism 13. The two spring plates 16,17 abut at the level of the groove-like lips. The second transport mechanism 13 is formed by two parallel running endless belts 22, 23 where neighboring sections clamp the cable and the two belts are formed, at least on the sides close to each other, from a soft elastic material. Furthermore, the slider 18 can shift the cable 1 in the transporting direction of the second transporting mechanism 13 between neighboring end sections of the endless belts 22, 23 forming the second transport mechanism.

Figure 7:
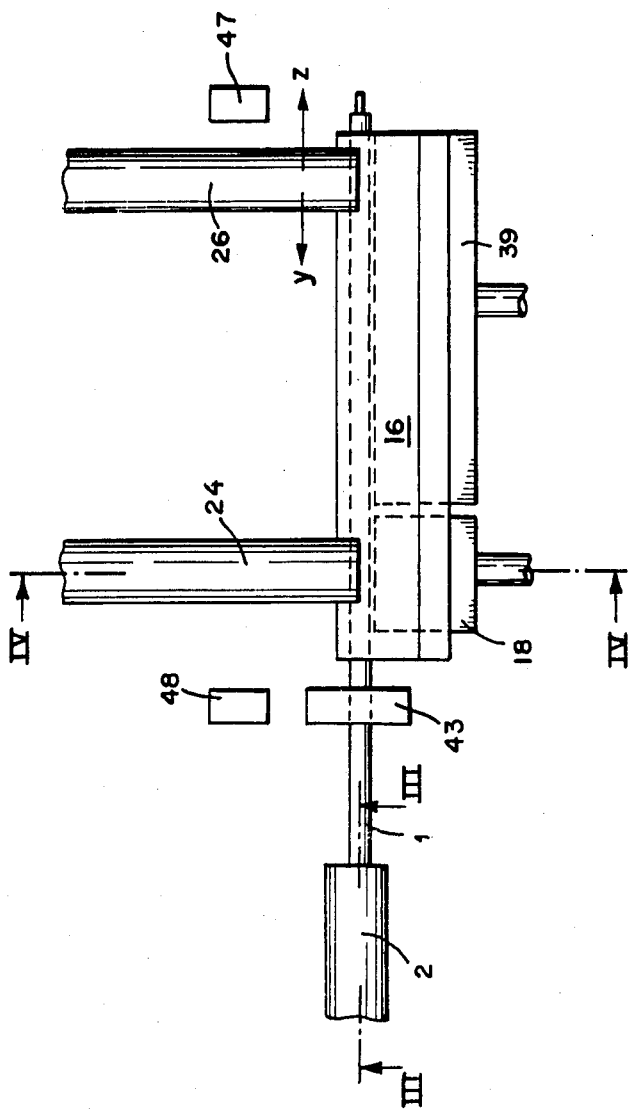
FIG. 7 is a schematic view of a cable cutting provision illustrating the presence of two belt transporting units and of such a device without employing a guide sleeve.

According to another aspect of the invention, shown in FIG. 7, there is provided a transport mechanism for an automatic cable confectioning machine which comprises a first transport mechanism which transports a cable in the direction of its longitudinal axis from an unwinding roll to a cutting station. A second transporting mechanism follows, which transports the cable further in a direction perpendicular to the cable axis and which is provided with clamping receiving areas into which the cable is inserted. The second transporting mechanism comprises two endless belt transport provisions which follow successively in the transporting direction of the first transporting mechanism.

Preferably, the two endless belt transporting units are provided with belt conveyors 24, 26. At least one belt conveyor 26 of the second transporting mechanism can be adjusted in its position in and opposite to the transporting direction of the transporting mechanism 2. The second belt conveyor 26 as seen from the first transport mechanism 2 is preferably adjusted in its position. The slider 18, 39 can be subdivided between the two belt conveyors 24, 26, and each part of the slider can be provided with a separately controllable drive mechanism.

In accordance with the solution provided by the invention, a channel follows a first transporting mechanism and guides the cable in the longitudinal axis of the channel. The channel extends to a second transporting mechanism. A slider engages the channel on a side remote from the second transporting mechanism and pushes the cable through a slot disposed opposite to the slider, which slot opens up upon advancement of the slider and moves the cable into a clamping receiver of the second of the transporting mechanism. The construction provides the advantage that in the case of such a feed mechanism, only a slider having a relatively small mass has to be moved, while the transporting mechanism otherwise remains undisturbed.

According to an advantageous feature of the present invention, the guide channel is closed over its full length on the side of the slot opening toward the second transport mechanism by lip-shaped abutting spring plates, where the but edges of the spring plates lift off from each other upon shifting the cable out of the guide channel by a spring mechanism. The advantage of these spring plates is that the opening and the closing of the guide channel is performed without special control elements.

It is a further advantage that the guide channel is formed by a continuous groove of a ledge bar into which a slider engages from the side remote from the second transport mechanism and which is covered at the side disposed toward the second transport mechanism by two spring plates which join and contact each other at the level of the groove-like lips. The use of the ledge bar results in the advantage that the spring plates can be easily attached and the slider receive guidance at the same time.

According to a further embodiment of the invention, the second transporting mechanism is provided by two endless belts where the neighboring sections clamp the cable between them, and the two belts are provided from soft elastic material at their sides disposed toward each other. The soft elastic provision of the belt allows a further insertion of the cable between the two belts such that a sliding-free gripping and transporting of the cable is assured.

In the case of the automatic confectioning machine taught in German Patent Application Laid-Open DE-OS No. 3,243,906, the second transporting mechanism comprises a single pair of belts. If it is desired to provide a longer cable section with contact terminals at its two ends, the cable section has to be transported after engaging the stop of a first contact connection in the longitudinal direction of the cable. In turn, the two belt section gripping the cable section must be separated from each other and the cable section transported with a further transporting mechanism in the direction of its longitudinal axis. This is an operational work step which requires a large amount of time and thus increases the cycle time of the procedure. In order to eliminate this disadvantage, it is further disclosed that the second transport mechanism comprises two endless belt transporting units disposed successively in the direction of transport of the first transporting mechanism. These two endless belts are provided as belt conveyors, and they are disposed at such a distance from each other that the cut-off cable section in each case is gripped at its ends for further transport. Processing stations are disposed on the side of the two belt conveyors, for example for attachment of the cable contact terminals. According to a further advantage of the invention, at least one belt conveyor of a second transporting mechanism is adjustable in its position relative to and in the direction of or opposite direction of the transport direction of the first transporting mechanism. Thus cable sections of freely selectable length can be processed at the two ends for further transport.

According to a further advantageous embodiment of the invention, a slider is provided between the two belt conveyors of the second transporting mechanism, and each part is provided with a separately controllable conveyor. It is thus possible to provide an end of several cable sections with a joint connection contact terminal, where the individual cable sections can be of different lengths. The longer of the cable sections in this case hang through between the two endless belts of the second transporting mechanism.

Figure 3:
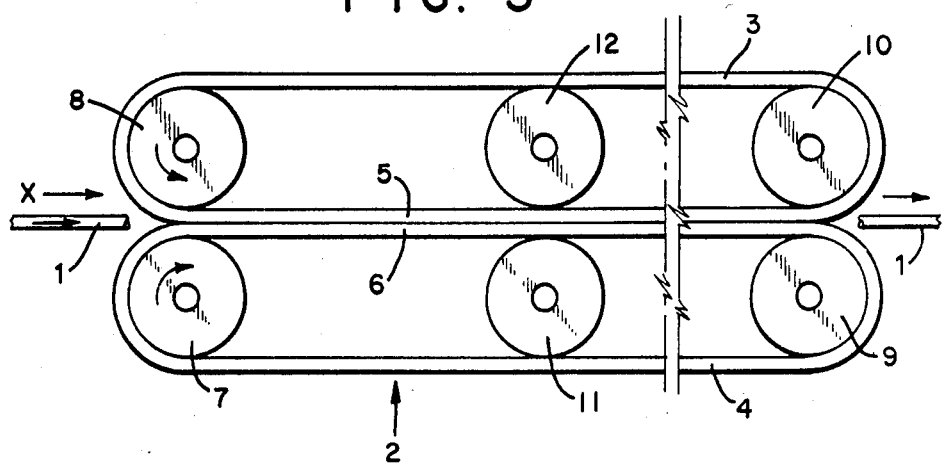
FIG. 3 is a section according to section line III—III through the transport unit of FIG. 1.
Figure 9:
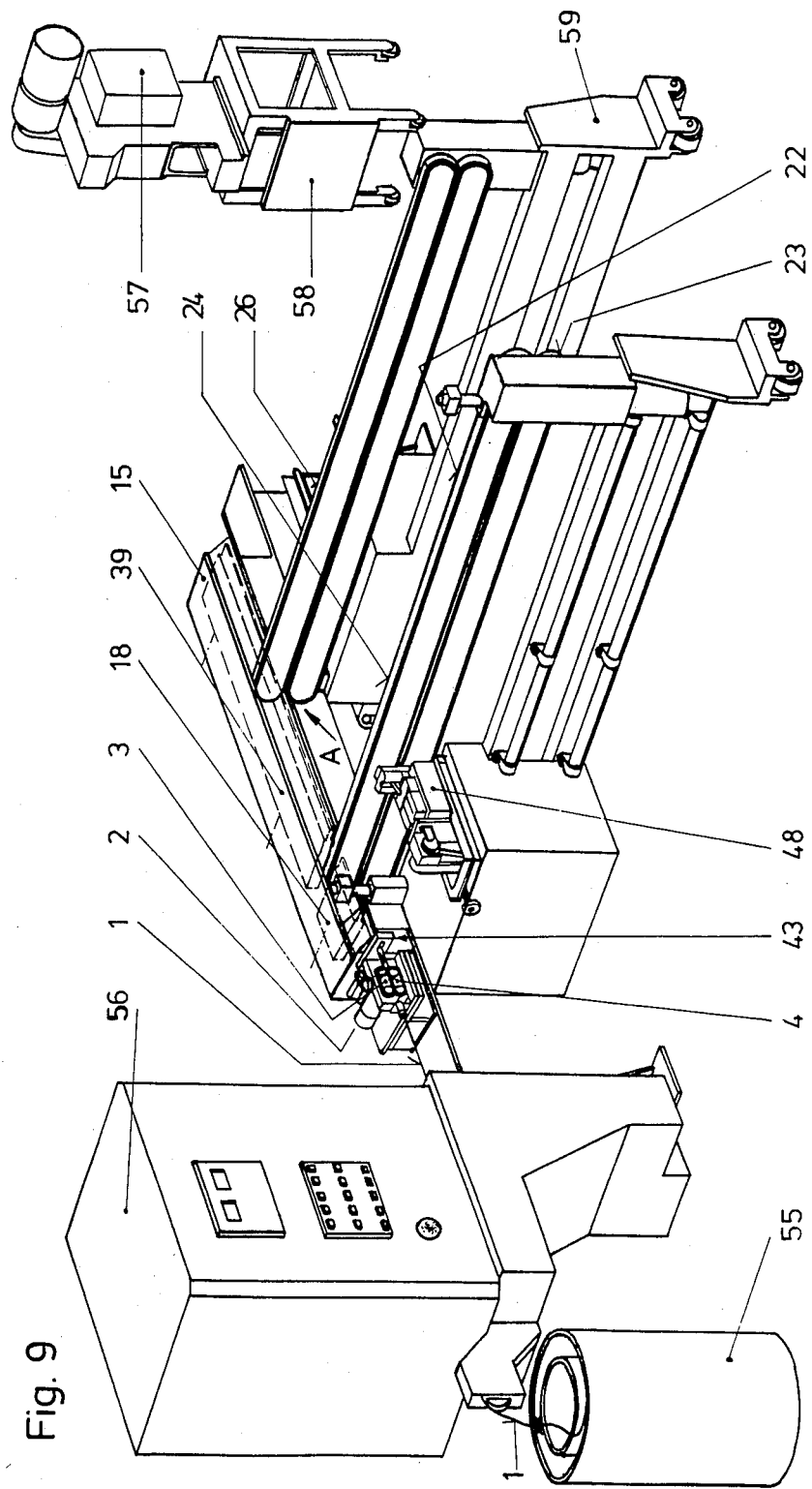
FIG. 9 is a perspective view of an embodiment of the invention apparatus.

The cable 1 is unwound from a drum illustrated as 55 in FIG. 9 and is transported by the first transport mechanism 2 in the direction marked x. This first transporting mechanism comprises a pair of belts 3, 4 as shown in FIG. 3, where the sections 5, 6 clamp the cable 1 between themselves. The belt conveyor is driven by the rollers 7, 8. The rollers 9, 10 form redirecting rollers while the rollers 11, 12 serve only to increase the contact of the belt sections 5, 6 at the cable which is to be transported further. The cable 1 is pushed into the guide channel 14 by the transporting mechanism 2, where the guide channel 14 is provided by a ledge bar 15 and by the spring plates 16 and 17. A slider 18, formed by a thicker sheet metal strip, engages from a side remote from the second transporting mechanism into the longitudinal groove of the ledge bar 15. Under a temporary spring lifting of the edge regions 19 of the spring plates 16, 17, this slider shifts the cable 1 to between the neighboring sections 20, 21 of the belts 22 and 23 forming the second transporting mechanism 13. The belts 22 and 23 are formed from elastic material or at least they exhibit a soft elastic surface such that the cable can be pushed far enough between adjoining section 20, 21 that the cable section 1 is gripped safely by the transporting mechanism 13. The cable 1 is preferably impressed into the belts to such an extent that the belts surround part of the circumference of the wire. The belts are to be sufficiently elastic such that a resulting impression of a able does not result in a permanent deformation of the belt, but such that the former configuration of the belt is restored. Before the cable 1 is pressed by the slider 18 into the second transporting mechanism 13, it is cut to the proper length by a cutting provision 124, 125.

The cycle time of the operation according to the invention can be from about 0.1 to 0.5 seconds and is preferably from about 0.2 to 0.3 seconds.

The ledge bar 15 of the cable feed guide system is inclined like a roof toward the second transporting mechanism 13. A spring plate 16, 17 is resting on each of the inclined surfaces and the spring plate is attached at the end 25 remote relative to the second transporting mechanism. The two spring plates 16, 17 adjoin each other like lips at the edge 19. These free edges 19, adjoining under pretension of the spring plates 16, 17, open up under the pressure of the slider 18 and allow the cable 1 to exit from the guide channel 14. The acute angle disposition of the two spring plates 16, 17 allows a feeding in of the cable ends between the two belt sections 20 and 21.

The second transport mechanism as shown in FIG. 7 comprises the belt conveyors 24 and 26 which are disposed successively in the transport direction of the transport mechanism 2. The belt conveyor 26 is formed exactly like the belt 24. However, the belt conveyor 26 is adjustable in the directions y and z jointly with the processing station 47 for the attachment of contact terminal pieces. The cable sections 1 can be cut to the proper length by the cutting station 124, 125 depending on the disposition of a second belt conveyor 26, and they can be processed at their two ends by the contact processing stations 47 and 48.

The feed system for the feed mechanism comprising the two belt conveyors 24 and 26 comprises two subdivided sliders 18 and 39, where the conveyors can be separately controlled. it is thus also possible to process the two ends of very long cable sections 1 at the same time. The cable 1 is advanced to such extent by the transport mechanism 2 that it is placed with its free end at the level of the processing station 47. The cable end is pushed between the two neighboring sections of the belt conveyor 26 by the slider 39. Then the transport mechanism 2 is operated again. A hanging through cable between the two belt conveyors 24 and 26 occurs during this step. Then the cable strand 1 is separated by the cutting station, and the second end of the cut off cable is pressed by the slider 18 between the belt sections 20, 21 of the belt conveyor 24. these cable ends are further transported up to the processing stations 48, 47.

It is possible with the subdivided slider to provide several cable sections at one end with one and the same connecting contact. For this purpose, the cable 1 is advanced by the transport mechanism 2 with its free end up to the level of the processing station 47. The cable 1 is cut by the station 43 and is pushed by the sliders 18 and 29 between the belt conveyors 24 and 26 into a hanging-through position, as described before. The belt conveyor 24 is actuated and the cut off cable end is transported a programmed distance. Following thereon, the cable 1 is pushed again with its free end up to the level of the processing station 47 by the first transporting mechanism 2 and is then slid by the slider 39 between the belt conveyor 26. Here the ends of the two cable sections are disposed next to each other and can be jointly provided with a connector terminal. Then the transport mechanism 2 is actuated such that the second cable section reaches a hanging through position. The cable section cut by the station 43 is now shifted by the slider 18 between the belt conveyor 24 and is transported by this belt conveyor 24 to the processing station 48.

In accordance with the present invention, there is further provided a transporting system for an automatic cable confectioning machine which comprises a first transport mechanism disposed ahead of a cutting device. The first transporting mechanism transports the cable fed from a roller in the direction of the longitudinal axis of the cable. A second transport mechanism is disposed behind the cutting provision, and this second transporting mechanism is formed by two endless belts which clamp the cable between them and transport it perpendicular to the cable axis. The second transport mechanism further comprises a slider which shifts the cable perpendicular to its longitudinal axis into the feed point between the two endless belts. A guide sleeve 28 is disposed between the first transport mechanism 2 and the cutting provision 124, 125, which guide sleeve 28 surrounds the cable 1 and follows the direction of motion of the slider upon insertion of the cable 1 between the two endless belts 22 and 23.

Preferably, the guide sleeve or guide jacket 28 is swivelled corresponding to the direction of motion of the slider 18 around an axis 27. The swivel axis 27 can be disposed near the entrance opening of the guide sleeve 28.

The guide sleeve 28 can be coupled to the slider 18 in a force transmitting way. The movable knife 125 of the cutting provision can be solidly connected to the slider 18. The side of the slider 18 directed toward the cutting provision 124, 125 can be provided as a knife edge 125 of the cutting provision.

The force transmitting coupling between the guide sleeve 28 and the slider 18 can be lifted at the beginning of the cutting procedure, and the guide sleeve 28 can come to rest at a stop 31. The swivelling guide sleeve 28 can be pulled or pressed by spring force in the cutting directiom against a stop 30 connected to the slider 18 and the swivelling guide sleeve 28 can be lifted from the slider 18 at the beginning of the cutting process. The lifting of the guide sleeve 28 from the stop 30 associated with the slider 18 can be performed by having the guide sleeve 28 contact a solid stop 37 and allowing the slider 18 to continue to move.

The guide sleeve 28 can be mated in its shape with a part 26 of the cutting provision, and this part in turn can be connected force transmittingly to the slider 18. The part 26 swivelling the guide sleeve and attached with the swivel end 31 of the guide sleeve 28 can be connected via a spring 33 with the slider 18 or with the movable knife edge 125, and it can be pressed during the cutting procedure by the spring 33 against a solidly disposed stop 37. The part 26 swivelling the guide sleeve 28 can be worked into a center ring punch which forms the fixed position knife edge during the cutting procedure.

In accordance with the present invention, there is provided an advantageous embodiment where the guide sleeve tilts in accordance to the direction of motion of the slider. In this context, it is advantageous to have the swivel axis close to the entrance opening of the guide sleeve. This makes it possible for the swivel axis to be formed immediately at the guide sleeve. However, it is also possible to dispose the swivel axis as seen from the insertion direction of the cable at a location further away from the guide sleeve. However, in this case, a somewhat complicated lever arrangement would have to be provided.

According to a further advantageous embodiment of the invention, the guide sleeve is force transmittingly connected to the slider, and the force transmitting coupling between the guide sleeve and the slider is lifted at the beginning of the cutting procedure. In this case, the guide sleeve moves against a fixed position stop while the slider advances further. It is thus achieved that the guide sleeve is swivelled only until the cable comes to rest in the cutting provision at the fixed position knife and the movable knife can perform the cutting process without further swivelling the guide sleeve.

In order to coordinate exactly the motion procedures of the slider and of the movable knife of the cutting provision, it is advantageous to connect the movable knife of the cutting provision solidly to the slider. It can even be advantageous to provide the side of the slider directed toward the cutting provision immediately as a knife of the cutting provision.

The force transmitting connection between the swivel guide sleeve and the slider is created advantageously by pulling the swivelling guide sleeve with spring force in the cutting direction against a stop attached to the slider and lifting it off at the beginning of the cutting procedure. This lifting of the guide sleeve from the stop connected to the slider is performed by having the guide sleeve contact a fixed position stop and allowing the slider to move further.

According to a further embodiment, the guide sleeve is matingly connected with a movable part of the cutting provision, and the movable part of the cutting provision in turn is force transmittingly connected to the slider. In this case, the part attached to the swivel end of the guide sleeve and swivelling with the guide sleeve is connected via a spring to the slider or to the movable knife and is pressed in the cutting process by the spring against a fixed position stop. It is advantageous that a center ring punch is worked into the part swivelling the guide sleeve since this forms the fixed position knife during the cutting process.

According to this advantageous embodiment, the cable 1 is unwound from a drum not shown here and is transported by a first transport mechanism 2 in the axial direction. This first transporting mechanism 2 comprises a belt pair 3, 4, and the sections 5, 6 of the belt pair clamp the cable between themselves. The belt conveyor is driven by the rollers 7, 8. The rollers 9, 10 form redirecting rollers whereas the rollers 11, 12 serve only to increase the contact pressure of the belt sections 5,6 on the cable to be transported. The cable 1 is slid into the guide channel 14 by the first transporting mechanism 2.

The guide channel 14 is formed by a longitudinal groove in the ledge bar 15 and by the spring plates 16, 17. A slider 18 engages the longitudinal groove of the ledge bar 15 from the side remote relative to the second transport mechanism 13. Under a temporary spring lifting of the edge regions 19 of the spring plates 16, 17, this slider 18 pushes the cable 1 between the neighboring sections 20, 21 of the belts 22, 23 forming the second transport mechanism. The belts 22, 23 are formed from an elastic material or at least they exhibit an elastic surface such that the cable can be slid as far in between the adjacently disposed belt sections 20, 21 as is necessary for the cable 1 to be safely gripped by the transport mechanism 13. After the cable 1 is pressed through by the slider 18 into the second transport mechanism 13, it is cut to a desired length by the cutting provision 124, 125.

Figure 2:
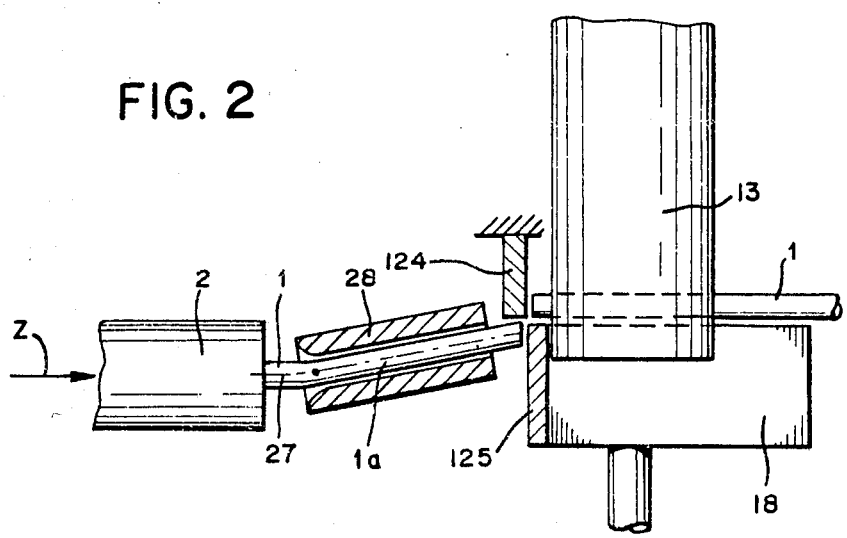
FIG. 2 is a sectional view of the cutting apparatus of FIG. 1 in cutting position.

As can be recognized from FIG. 1, there is disposed a guide tube 28 between the first transport mechanism 2 and the cutting provision 124, 125, and the cable passes through the guide tube 28. This guide tube 28 is tiltably supported around an axis 27 and is tilted, as is illustrated in FIG. 2, with the insertion of the slider 18 into the input of the belt sections 20, 21, such that the cable 1 comes to rest at fixed position knife 124 of the cutting provision. The guide tube 28 is swivelled back into the starting position, as shown in FIG. 1, with the moving back of the slider 18. The guide tube is to prevent the section 1a of the cable from being deformed from the cable axis z. After the cable is cut, it is fed back into the axis z such that the free section can be inserted and threaded into the guide channel 14 with assurance.

Figure 6:
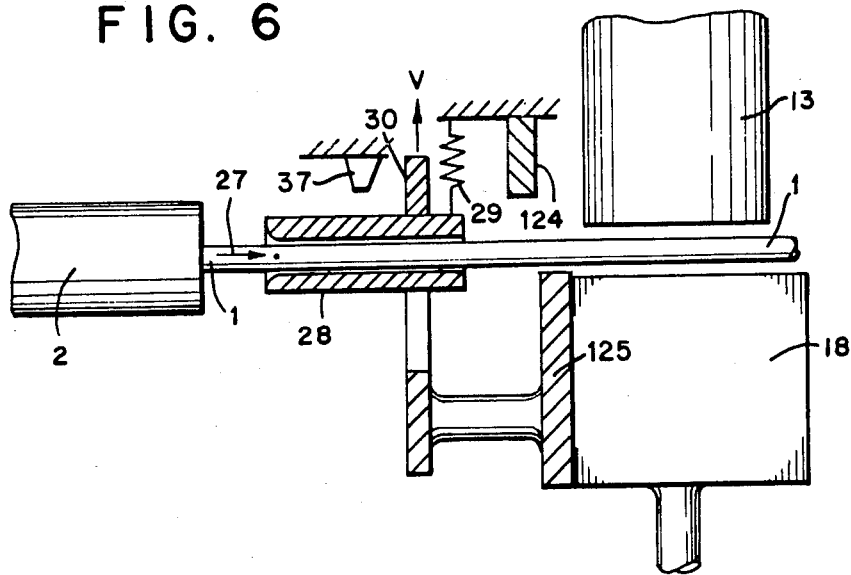
FIG. 6 is a schematic view of a further embodiment of a cable cutting provision.

The guide sleeve 28 is pressed by a pull spring 29 against a movable stop 30 according to the embodiment of the swivelling provision shown in FIG. 6. The stop 30 is rigidly connected to the movable knife 125 and the slider 18. Upon insertion of the slider into the input of the two sections 20, 21 of the endless belts 22, 23, the movable stop 30 is adjusted in the direction V. During the adjustment of the stop 30, the pull spring 29 provides for an assured positioning of the guide sleeve at the stop 30 and in fact as long as until the guide sleeve 28 comes to rest at the spacially fixed stop position 37. The cable 1 is resting at the fixed position knife 124 of the cutting provision in this position of the guide sleeve. With a further advancement of the movable knife 125, the cable is cut. During this cutting process, the movable stop 30 is lifted off the guide sleeve 28. During the cutting process, when the cable 1 is resting on the fixed position knife 124, the guide sleeve 28 is not tilted. Upon return of the slider 18, the guide sleeve 28 is pulled back against the force of the pulling spring 29 into the starting position as shown in the drawings.

Figure 5:
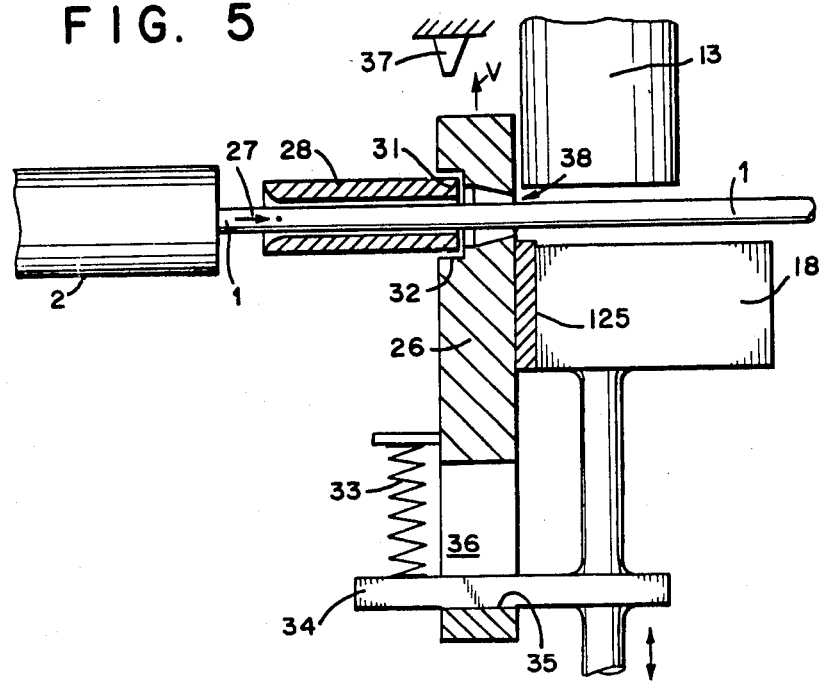
FIG. 5 is a view of another embodiment of a cable transporting unit.

In accordance with the swivelling provision of the guide sleeve 28 as illustrated in FIG. 5, the front swivel end 31 of the guide sleeve 28 engages a recess 32 of a flap shaped part 26 coupled to the slider 18. The coupling of this part 26 to the slider is fore transmitting, where a compression spring 33 presses a flange 34 rigidly coupled to the slider 18 against the edge 35 of a recess 36. With an insertion of the slider into the input of the transport mechanism 13, the flap shaped part 26 is shifted via the spring 33 in the direction V until it comes to rest at a fixed position stop 37. This flange shaped part 26 is formed as a center punch carrier at 38. The cable is cut by the movable knife 125 in this center punch carrier.

Figure 8:
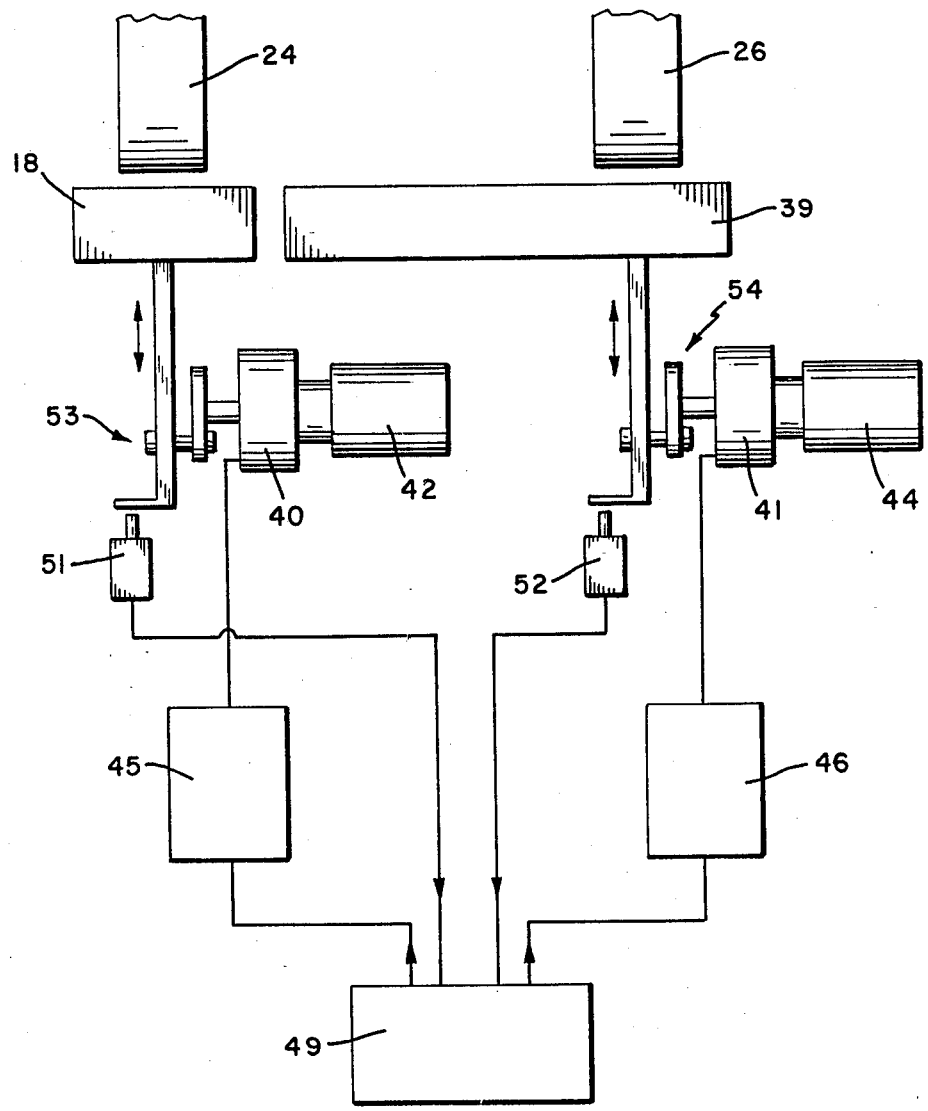
FIG. 8 is a schematic view of process control steps employed during operation of the invention apparatus.

FIG. 8 is an illustration of the operating processes involved in running the invention system. The belt conveyors 24 and 26 are illustrated in a similar perspective as that shown in FIG. 7. The relative dimensions of the sliders 18 and 39 are illustrated as being different. The two sliders 18 and 39 are driven by the two motors 42 and 44 in each case via a switching coupling 40, 41 formed as a coupling-brake combination and via a cam drive 53 and 54. Control of the two switching couplings 40 and 41 is performed such that the two sliders can be operated independently of each other. According to the embodiment of FIG. 8 a numeric control 49, which is programmed by an operator, controls the two switching couplings 40, 41 with its two independent outputs via adaptor circuits 45 and 46. The position of the eccentric cam drive 53, 54 and therefore the position of the sliders 18, 39 is supervised by the control 49 via the two sensor elements 51 and 52. Depending on how the control is programmed, the operators can simultaneously release the sliders 18, 39 so that the lines can be clamped in a stretched way between the two endless belt conveyors 24, 26. Alternatively, a course of operation can be selected, where the cable is hanging through between the two endless belt conveyors and where the two sliders 18 and 39 are actuated successively.

The perspective view illustrated in FIG. 9 furnishes further details. On the left hand side a cable drum 55 provides starting material. A control case 56 can be constructed so as to serve all drives of the invention apparatus. A movable support frame 59 is furnished for the belt conveyors 26 and 24, respectively. A support from below 59 can be flanged to a processing station 57 via face 58. This processing station 57 can be for example an insulation providing station or a station serving another process such as, for example, crimping. In this context, the point is that the processing station 57 is solidly connected to the support frame 59 and that the processing station 57 can only be moved together with the support frame 59.

Figure 10:
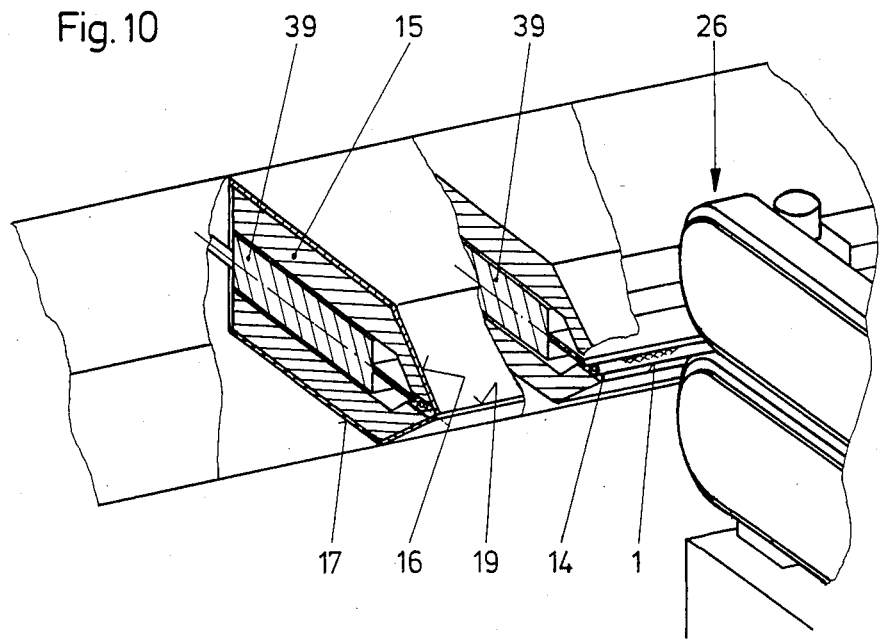
FIG. 10 is a perspective view from the direction A to the feed of the endless band transporting unit similar to a third of FIG. 7 on the right hand side, plus two sectional views of a slider employed according to the invention.

FIG. 10 illustrates the insertion of the cable 1 guided by the guide channel 14 provided by ledge bar 15 and spring plate 17. The cable 1 pases the lips at edge 19 to be positioned between the belt conveyors 26.

Figure 11:
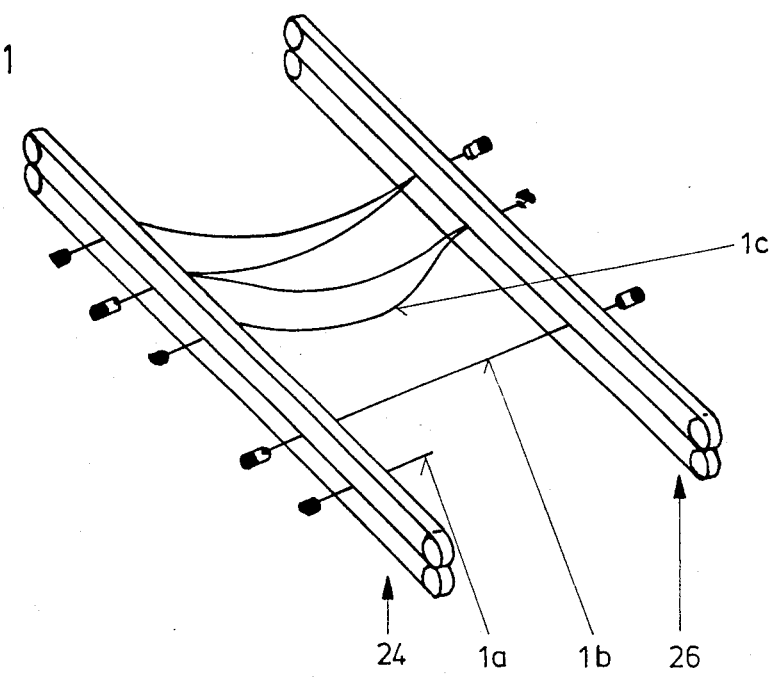
FIG. 11 is a perspective illustration of wire harnesses carried by belt conveyors.
Figure 12:
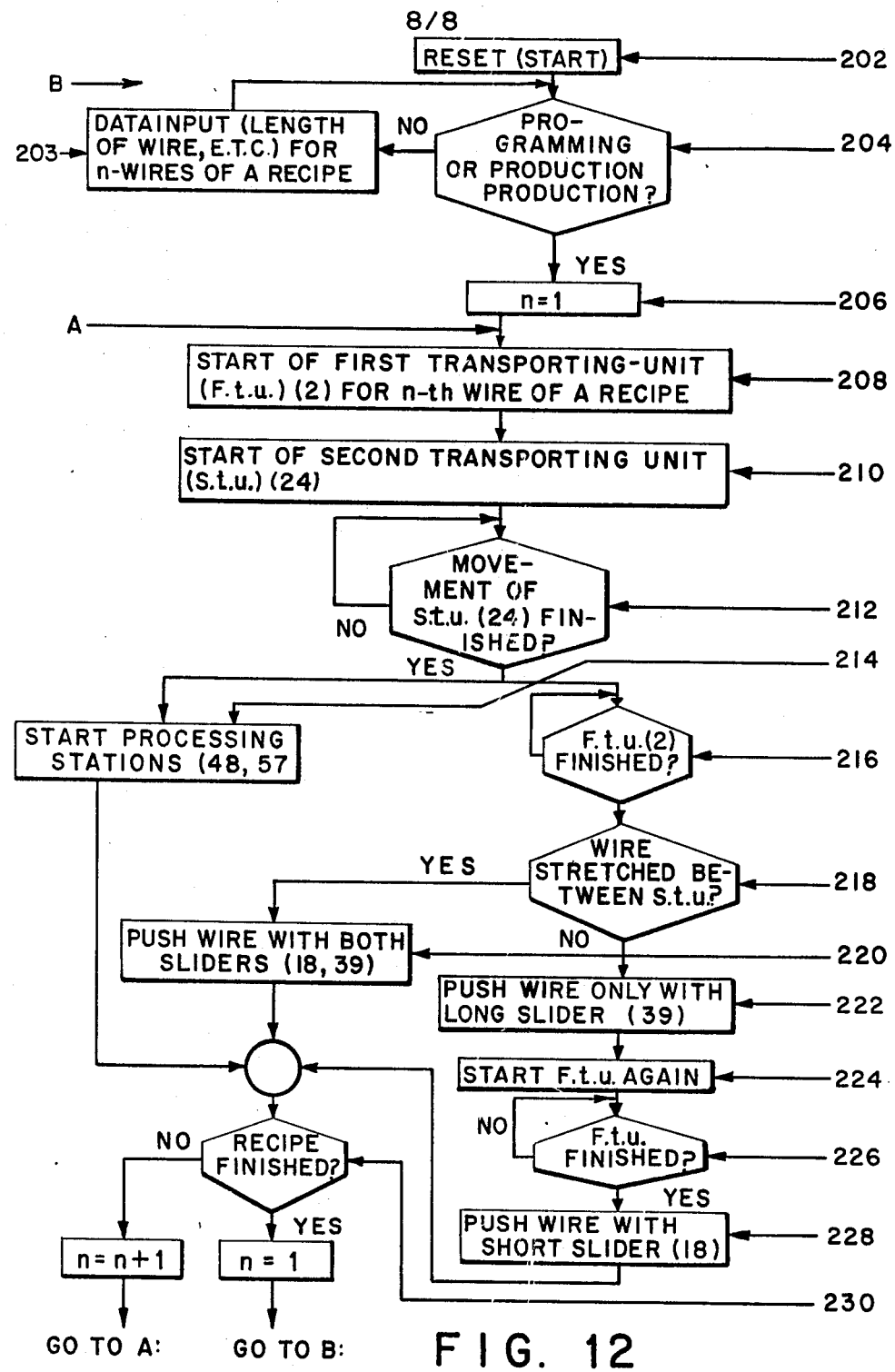
FIG. 12 is a schematic diagram of control steps performed during operation of the invention system.

FIG. 11 is a view of a relative configuration of the wires with respect to the conveyor belts 24 and 26. The depiction of the cable 1a illustrates that in the case of short cable cuts with only one contact part attached to one side, only one belt conveyor 24 is required and only one slider 18 is employed. In the case of longer cable sections, such as illustrated under 1b in FIG. 11, which are to be provided with contact sections on each of the two ends, the wire is pushed with the two sliders 18 and 39 between the endless belt conveyors 24 and 26. The wire 1b is transported uniformly by the two endless belt conveyors 24 and 26. The cable sections 1c are joined to a cable chain. In this context it is necessary that the cable hangs through between the belt conveyors 24 and 26. The two sliders 18 and 39 are operated at different times.

Thus it is possible with the subdivided slider construction to provide several cable sections at one end with one and the same connector contact terminal. For this purpose the cable 1 is advanced by the transport mechanism 2 to such a point that the free end of the cable 1 is at the level of the processing station 47. Then the cable 1 is slid by the slider 39 to between the two belts of the belt conveyor 26 such that one cable end is fixed in place. Then a further advance of the transport mechanism 2 is furnished such that the cable 1 hangs through between the two endless belt conveyors 24 and 26. The cable 1 is then pushed with the slider 18 between the belts of the belt conveyor 24 and is cut off by the station 43. The endless belt conveyor 24 is actuated and the cut off cable end is transported a programmed distance. The cable is then shifted by the first transporting mechanism 2 with its free end up to the level of the processing station 47 and is then shifted by the slider 39 between the belts of the endless belt conveyor 26. The endless belt conveyor 26 further transports the ends of the two cable sections placed next to each other to the processing station 57, and they are provided at this point jointly with a connector terminal. The first transport mechanism 2 is actuated when the further transport of the endless belt conveyor 26 occurs. The transport mechanism 2 carries the cable as far as necessary to reach the desired length of the second cable section. The cable 1 is then slid between the belts of the endless belt conveyor 24 and is cut off by the station 43.

If the cable chain is to be provided of only two members, then the cut off end of the second cable section is transported by the endless belt conveyor 24 to the station 48. However, if the end of a further cable section is to be attached to this end, then further transport to the station is interrupted and instead initially the cable with its end still free is transported to the processing station 57 and is clamped by the slider 39 in between the belts of the endless belt conveyor 26. The transport mechanism 2 is then actuated, and the cable is advanced to such a point that the third cable section is of the right length. When the cable 1 reaches this position, it is slid by the slider 18 in between the belts of the endless belt conveyor 24 and is cut off in the station 43. Thereupon a further transport is provided for the cable ends disposed next to each other to the station 48. The station 48 furnishes the cable ends disposed next to each other with a joint connector terminal.

The mode of operation of the invention apparatus is further illustrated by way of a flow diagram indicating a logical sequence of steps to be performed. The apparatus is initially reset and started for initiation of operations as indicated in block 202. A next step is to decide on whether the machine is to be programmed by input of data for example or if a production run is to be performed. If a data input or programming of the machine is desired than a loop 203 is run through and the flow returns to the point of decision if a production run is desired. The data input is called a sequence, recipe, or module and concerns for example the total number of lines n to be produced in the next production run. Furthermore, these lines can be of varying desired lengths and they can have different distances on the belt conveyors 24, 26.

After the production run has been set, the first cable lines (n=1) of a recipe is produced according to block 206.

In a next step, the transporting unit 3, 4, which transports the cable in axial direction, is started for a certain wire number of a recipe run.

Then the second transporting unit comprising the belt conveyors 24 and 26 is started while the longitudinal transporting unit with belts 3, 4 is running and moves the cable into the cable channel provided by belts 3, 4 according to block 210. Thereby a distance is generated relative to a previous cable section on the belt conveyors 24 and 26.

Now the process determining computer unit waits for a termination of the motion of the cross transport belt conveyors 24 and 26 according to block 212.

When the motion of the belt conveyors 24 and 26 is a terminated operation is begun for those processing stations 48 and 57 that are faced with a cable that is to be processed in such a station as set forth in block 214.

At the same time and in parallel the process determining computer unit waits for the termination of the furnishing of a proper length section by the station 43 as indicated in block 216.

After the cable section is cut to length, it is determined if the cable should be processed while stretched between the belt conveyors 24 and 26 or if the cable should hang through between the belt conveyors 24 and 26 according to block 218.

If the cable is to be run and processed as a stretched wire, then the two sliders 18 and 39 are actuated simultaneously according to block 220.

If the line sections of the cable are to be longer than those of a stretched length between the belt conveyors 24 and and 26, then only the slider 39 is actuated at this point according to block 222.

Then the first transporting unit 2 for providing proper length is started again according to block 224.

Further operation is halted until the cable section has reached proper length and the first transporting unit has terminated its motion according to the block 226.

Now the wire is pushed with the slider 18 to between the belts of the belt conveyor 18 as set forth in block 228.

The wire is cut to section length at an appropriate moment in time.

If one recipe run has been completed, a first line of another recipe run is called up. If the recipe run has not terminated, then the next cable line of the recipe run is called according to block 230.

It will be understood that each of the elements described above, or two or more together, may also find a useful application in other types of transport devices and procedures differing from the types described above.

While the invention has been illustrated and described as embodied in the context of a transport system for automatic cable processing machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A method for transporting a cable in an automatic cable processing machine comprising resetting the machine for starting a process cycle; electronically determining if a data input or if a programming input for a recipe of cable production is to be performed;
    producing a cable line according to a recipe by feeding in a cable from a cable supply means and transporting a cable coming from the cable supply means in the direction of the axis of the cable with a first transporting unit; starting a second transporting unit to run, where the direction of advance of the second transporting unit is at an angle relative to the direction of the first transporting unit;
    determining an end of the running of the section transporting unit by employing a sensor for position of the second transporting unit;
    cutting the cable to proper length in a cutting station; pushing the cable section with a slider through a slot adapted to open up upon advancement of the slider toward the slot;
    transporting the cable in a direction about perpendicular to the axis of the cable with the second transporting unit disposed near the output end of the slot.

2. The method of transporting a cable in an automatic cable processing machine according to claim 1 further comprising
    guiding the cable in a guide sleeve disposed between the first transporting unit and the cutting station; which guide sleeve upon an insertion of the cable in between two endless belts of the second transporting unit approximately follows the direction of motion of the cable.

3. The method of transporting a cable in an automatic cable processing machine according to claim 2 further comprising
    transporting a cable coming from the cable supply means in the direction of the axis of the cable with a first transporting unit;
    transporting the cable in a direction about perpendicular to the axis of the cable with a second transporting unit comprising two endless belts following the first transporting units and positioned in sequence along a line parallel to the transporting direction of the first transporting unit;
    moving the cable in a direction about perpendicular to its axis into a clamping pinch carrier provided by elastic endless belts of the second transporting unit.

4. The methd of transporting a cable in an automatic cable processing machine according to claim 2 further comprising
    guiding the cable in a guide sleeve disposed between the first transporting unit and the second transporting unit, which guide sleeve upon an insertion of the cable between the two endless belts of the second transporting unit approximately follows the direction of motion of the cable.

* * * * *